United States Patent
Gretz (10) Patent No.: US 10,103,533 B1
(45) Date of Patent: Oct. 16, 2018

(54) ELECTRICAL COUNTERTOP BOX WITH TRAPDOOR COVER

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/825,362

(22) Filed: Nov. 29, 2017

Related U.S. Application Data (60) Provisional application No. 62/427,495, filed on Nov. 29, 2016.

(51) Int. Cl.
| | |
|---|---|
| *H02G 3/18* | (2006.01) |
| *H02G 3/04* | (2006.01) |
| *H02G 3/12* | (2006.01) |
| *H02G 3/38* | (2006.01) |
| *H02G 3/00* | (2006.01) |
| *A47B 77/02* | (2006.01) |
| *H01H 9/02* | (2006.01) |
| *H02G 3/08* | (2006.01) |

(52) U.S. Cl.
CPC .............. *H02G 3/18* (2013.01); *H02G 3/0493* (2013.01); *H02G 3/126* (2013.01); *H02G 3/26* (2013.01); *H02G 3/38* (2013.01); *A47B 77/022* (2013.01); *H01H 9/02* (2013.01); *H02G 3/081* (2013.01)

(58) Field of Classification Search
CPC ........ H02G 3/18; H02G 3/0493; H02G 3/126; H02G 3/26; H02G 3/081; H02G 3/38
USPC .......................................................... 174/50
See application file for complete search history.

(56) References Cited

U.S. PATENT DOCUMENTS

| | | | |
|---|---|---|---|
| 5,285,009 A | 2/1994 | Bowman et al. | |
| 6,162,071 A * | 12/2000 | Muller ................... | A47B 21/06 174/502 |
| 6,265,662 B1 | 7/2001 | Riedy et al. | |
| 6,329,595 B1 * | 12/2001 | Roberts .................. | A47B 21/06 174/53 |
| 7,126,059 B2 | 10/2006 | Dinh et al. | |
| 7,348,487 B2 | 5/2008 | Drane | |
| 7,586,039 B1 | 9/2009 | Gretz | |
| 7,989,711 B2 | 8/2011 | Jolly | |
| 8,704,090 B2 | 4/2014 | Carbone et al. | |
| 8,772,649 B1 * | 7/2014 | Gretz ....................... | H02G 3/14 174/480 |

(Continued)

*Primary Examiner* — Dhirubhai R Patel (57) ABSTRACT

An electrical box assembly for mounting an electrical component in a countertop. The assembly includes an electrical box with an enclosure adapted to receive electrical wiring. A sidewall on the electrical box includes one or more channels each including a channel bottom, a ramp, and a channel cover with a slot. A mounting bracket includes a base and two arm members and is loosely assembled to the electrical box with the mounting fasteners. A cover bracket is secured in each of the slots. A cover provides access to the electrical component and includes a cover plate, a cavity for housing an electrical component, and a snap-engagement latch for selectively latching the electrical component outward of the cover plate or inward within the electrical box enclosure. Installation time and effort are minimized as site preparation requires only a single hole that may be made with a standard size hole-saw.

7 Claims, 9 Drawing Sheets

(56) References Cited

U.S. PATENT DOCUMENTS 8,884,161 B1 11/2014 Gretz
9,065,264 B2 * 6/2015 Cooper ................... H02G 3/16
9,035,201 B2 10/2015 Jones

* cited by examiner

ELECTRICAL COUNTERTOP BOX WITH TRAPDOOR COVER

This application claims the benefit of provisional U.S. Application No. 62/427,495, filed Nov. 29, 2016.

FIELD OF THE INVENTION

This invention relates to mounting of electrical components to a structure and more specifically to a countertop box assembly for mounting an electrical component to a countertop.

BACKGROUND

Electrical outlets are needed to provide power for the vast assortment of electrical appliances used in the kitchen. For convenience and ease of access, homeowners often prefer to mount an electrical outlet in the kitchen countertop. Conventional electrical boxes for countertops are typically affixed to the countertop with adhesive.

However, securing conventional countertop boxes to the countertop limits the ability for later adjusting the alignment of the box with respect to a wall or backsplash. After the conventional countertop box is secured to the counter with adhesive, the box cannot be easily realigned. Attempts at realigning the box with respect to the backsplash requires substantial effort in breaking the adhesive bond between the box and the countertop and risks damage to the countertop surface.

Accordingly, what is needed is a countertop electrical box that eliminates the use of adhesive for affixing the box to the countertop. Such a device would eliminate the use of messy adhesive that can potentially show around the perimeter of the installed electrical box. Such a device would also enable easy realignment of the electrical box and the installed electrical component with respect to the backsplash or wall after the initial installation.

BRIEF SUMMARY OF THE INVENTION

The current invention is an electrical box assembly for quickly and easily installing a duplex receptacle in a countertop. The countertop box assembly includes a bracket, an electrical box, cover brackets, mounting fasteners, and a cover for providing access to an electrical component mounted within the assembly. Installing the electrical box assembly to a countertop requires simple preparation by a hole saw. The electrical box includes a sidewall including two channels each having a channel bottom and a channel cover with a slot therein. A ramp is provided in each channel bottom. The bracket includes a base and two arm members and is loosely assembled to the electrical box with the mounting fasteners. The cover brackets include a base with an opening therein. The cover includes a cover plate, a cavity for housing an electrical component, and a snap-engagement latch for opening and closing the cover with respect to the cover plate. The countertop box assembly enables easy mounting of a duplex receptacle within a countertop.

OBJECTS AND ADVANTAGES

A first object of the current invention is to provide a countertop electrical box that eliminates the need for adhesive in affixing the box to the countertop.

A further object of the invention is to provide an electrical box assembly that can be easily realigned at any time after initial installation A further object of the invention is to provide an electrical box assembly including a cover that, when closed, obscures all mounting fasteners from view.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
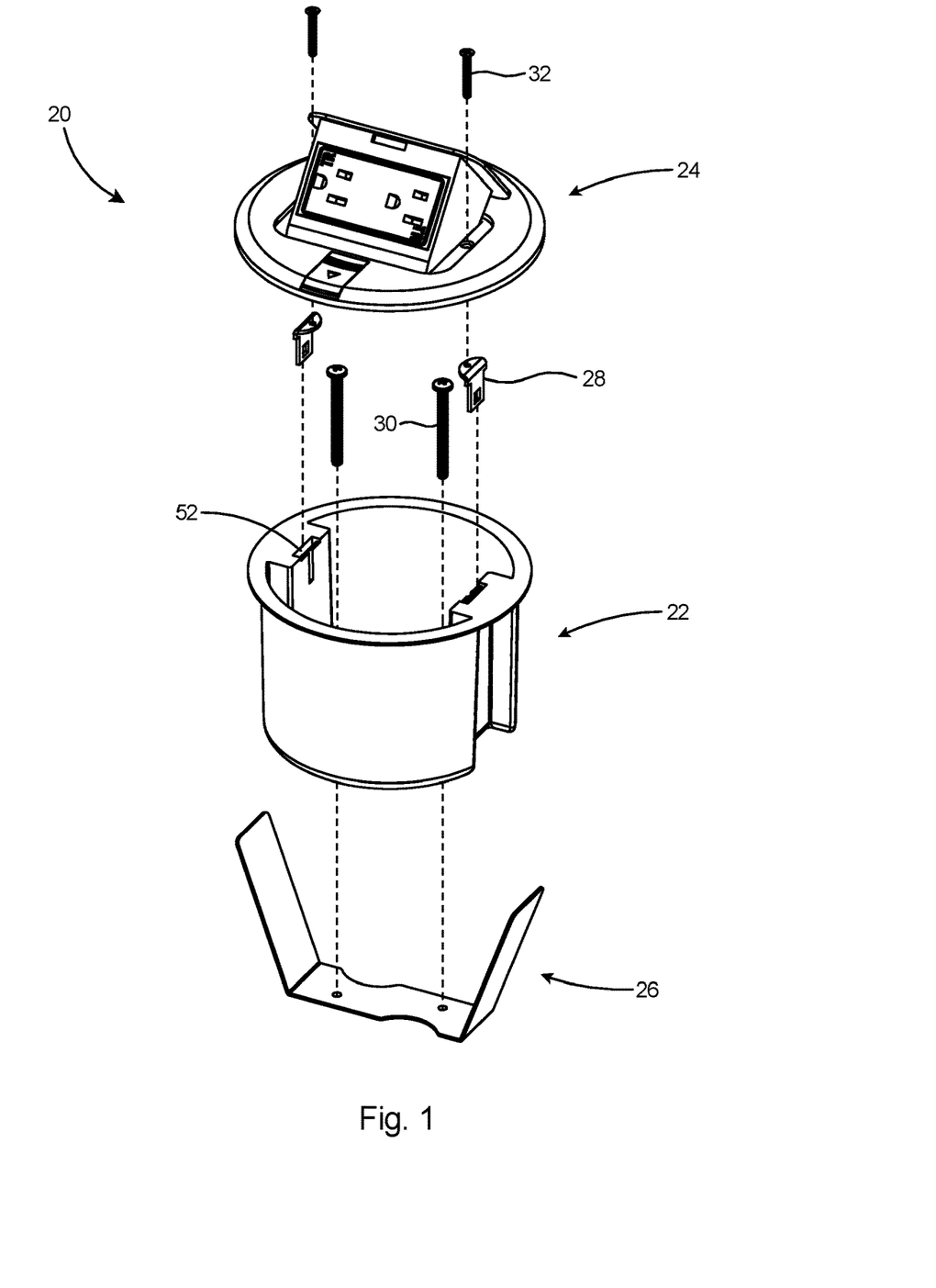
FIG. 1 is an exploded isometric view of a first embodiment of an electrical box assembly in accordance with embodiments of the invention.

With reference to FIG. 1, the present invention is an electrical box assembly 20 for installing an electrical receptacle to a countertop. The electrical box assembly 20 includes an electrical box 22, a cover 24, a countertop bracket 26, two cover brackets 28, mounting fasteners 30 for securing the electrical box 22 to the countertop bracket 26, and cover fasteners 32 for securing the cover 24 to the electrical box 22.

Figure 2:
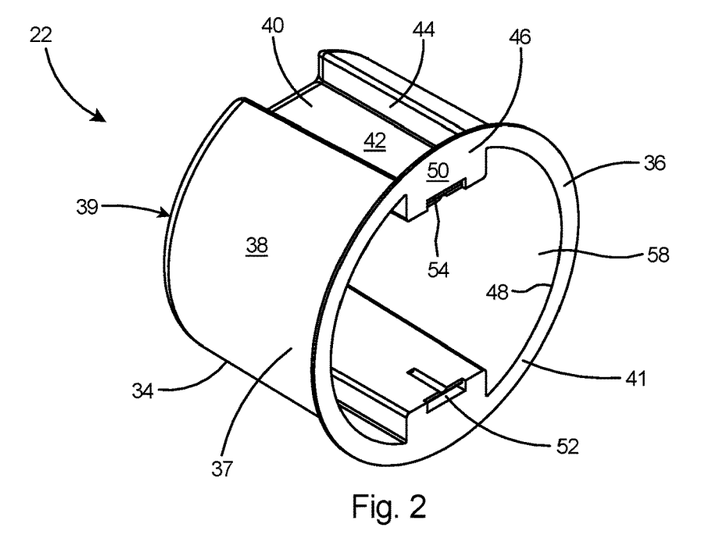
FIG. 2 is an isometric view of an electrical box that forms a portion of the electrical box assembly of FIG. 1.
Figure 3:
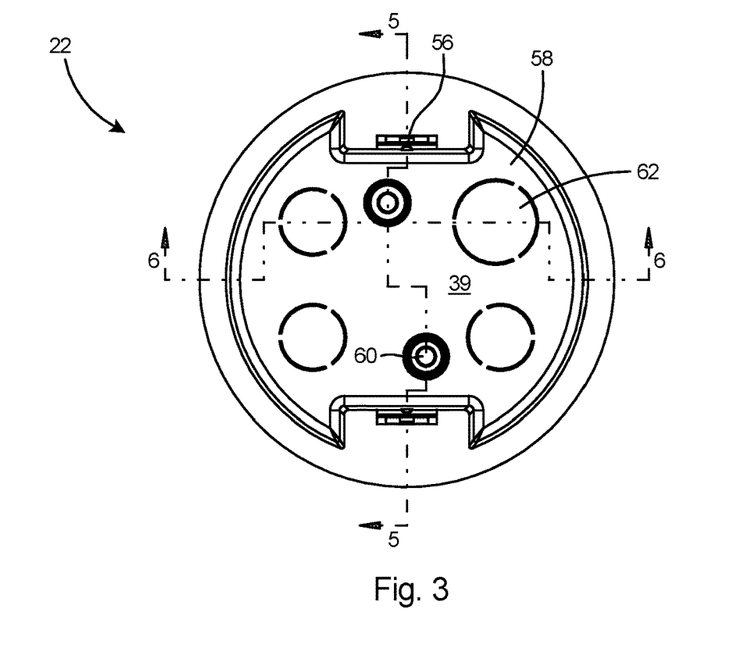
FIG. 3 is a top view of the electrical box.
Figure 13:
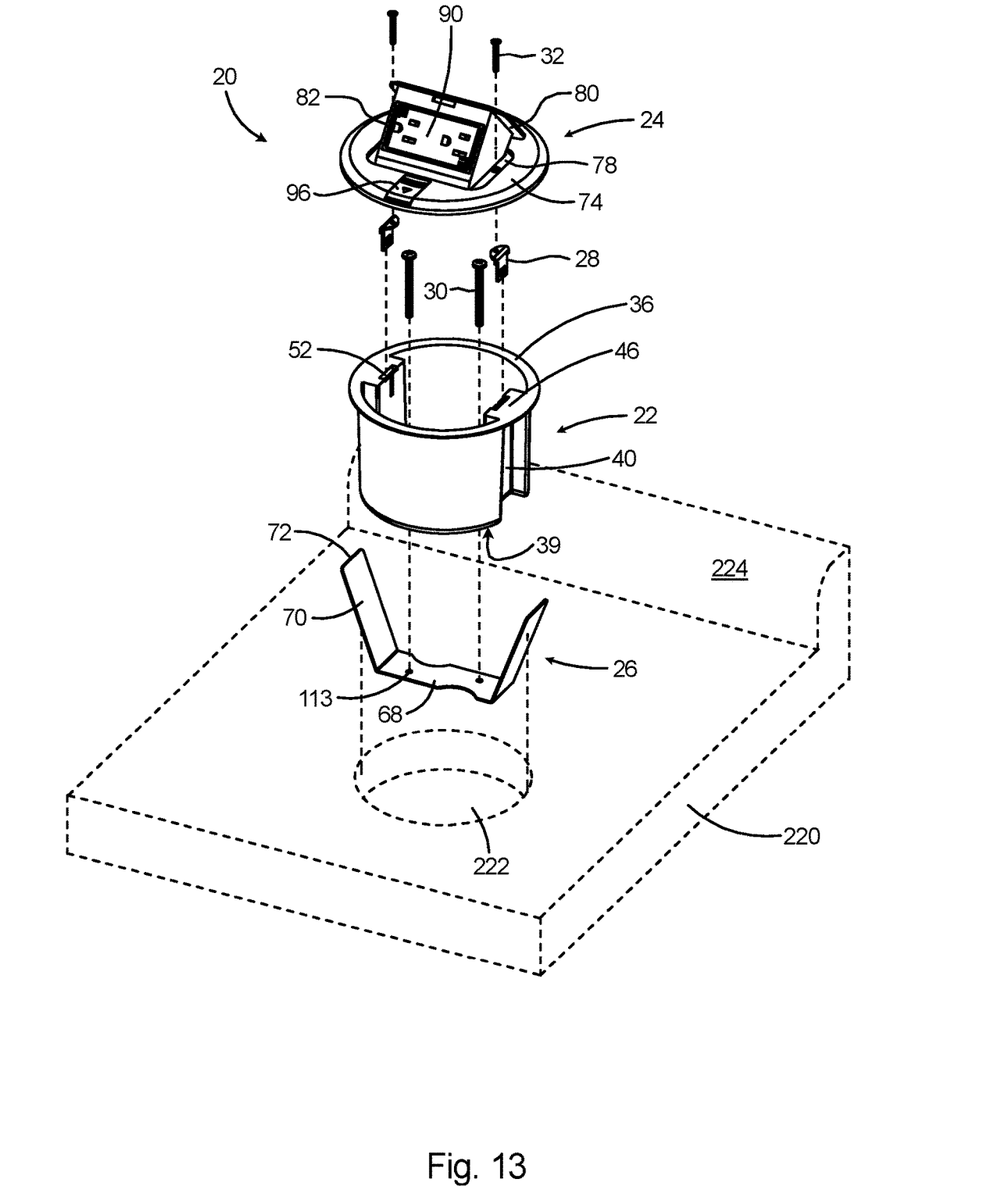
FIG. 13 is an exploded isometric view of the electrical box assembly of FIG. 1 in alignment with a countertop to which it will be installed.

Referring to FIGS. 2-3, the electrical box 22 includes a body 34 having a rim 36, a substantially circular sidewall 38, and a bottom wall 39. The rim 36 extends around the entire outer periphery 37 of the electrical box 22 at the open end 41 of the box. Two channels 40 are formed in the sidewall 38 at substantially 180 degrees apart on the box body. The channels 40 each include a planar channel bottom 42 and planar channel sides 44 that are substantially perpendicular to the rim 36. The rim 36 includes a channel cover 46 extending inward from the inner periphery 48 of the rim 36. The channel cover 46 is coplanar with the rim 36 of the electrical box 22, wherein the channel cover 46 includes a top surface 50 that is flush with the rim 36. A slot 52 is formed in each channel cover 46 with the inner side 54 of the slot 52 adjacent the channel bottom 42. A ramp 56, adjacent to the slot 52, is provided in the channel bottom 42. Bottom wall 39 and sidewall 38 form an electrical enclosure 58. The mounting fasteners 30 extend through the bottom wall 39 and through the countertop bracket 26 establishing the electrical box 22 and countertop bracket 26 assembly, with the mounting fasteners 30 aligning the arms 70 of the countertop bracket 26 with the channels 40 of the electrical box 22. When inserted through a hole, as shown in FIG. 13, the flexible arms 70 will flex inward into the channels 40 thereby enabling the arms 70 to flex completely out of the way as the electrical box 22 is inserted through the countertop 220. After passing through the countertop 220, arms 70 flex outwardly to their unbiased orientation and are available for clamping against the back side of the countertop 220 upon tightening of the mounting fasteners 30, which tightening action draws countertop bracket 26 against the bottom wall 39 of the electrical box 22 and secures the electrical box 22 against the countertop 220. As shown in FIG. 3, one or more apertures 60 and one or more knockouts 62 are provided in the bottom wall 39 of the electrical box.

Figure 4:
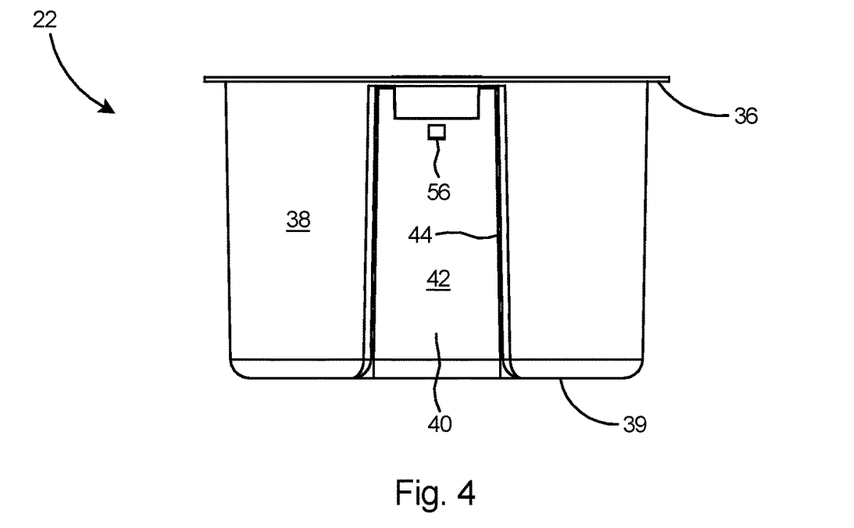
FIG. 4 is a side view of the electrical box.
Figure 5:
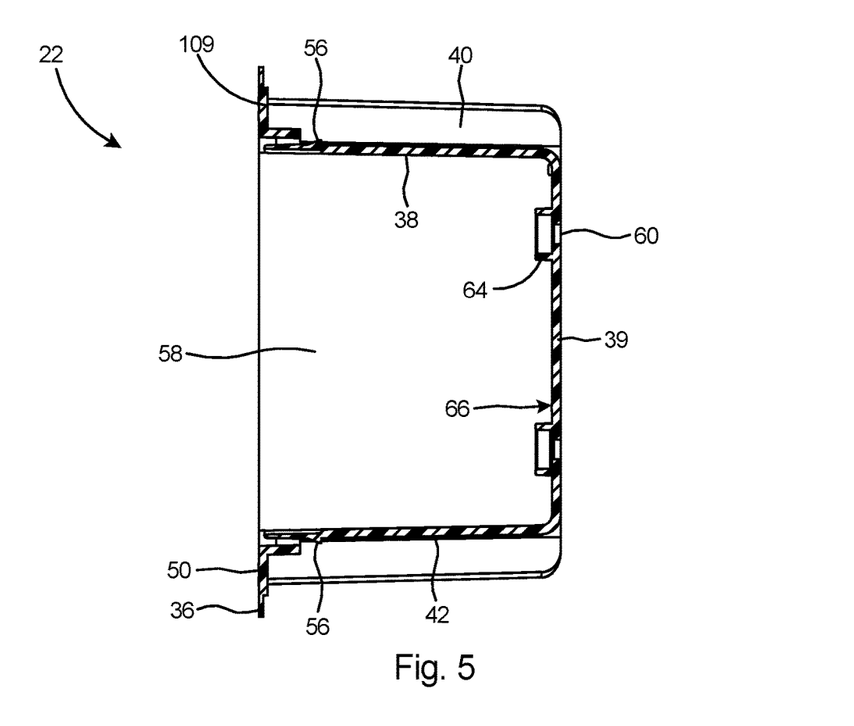
FIG. 5 is a sectional view of the electrical box taken along line 5-5 of FIG. 3.
Figure 6:
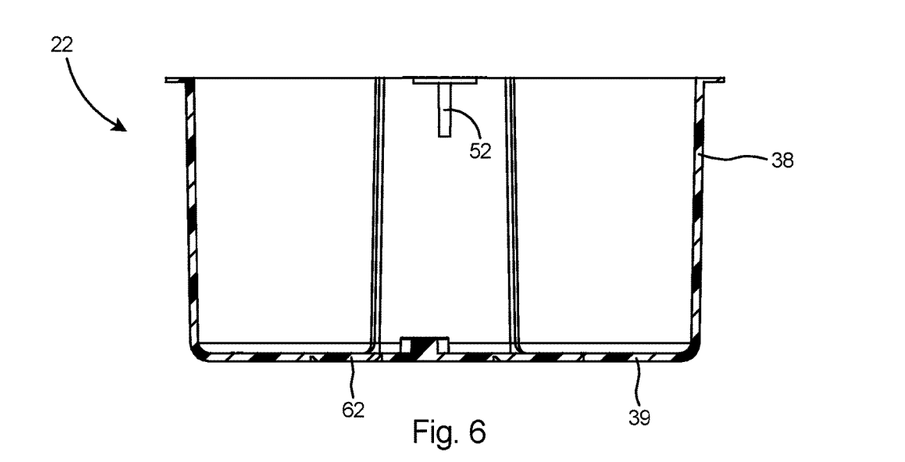
FIG. 6 is a sectional view of the electrical box taken along line 6-6 of FIG. 3.

Referring to FIGS. 4-6, the apertures 60 in bottom wall 39 are surrounded by peripheral walls 64 that extend from the top surface 66 of the bottom wall into the electrical enclosure 58.

Figure 7:
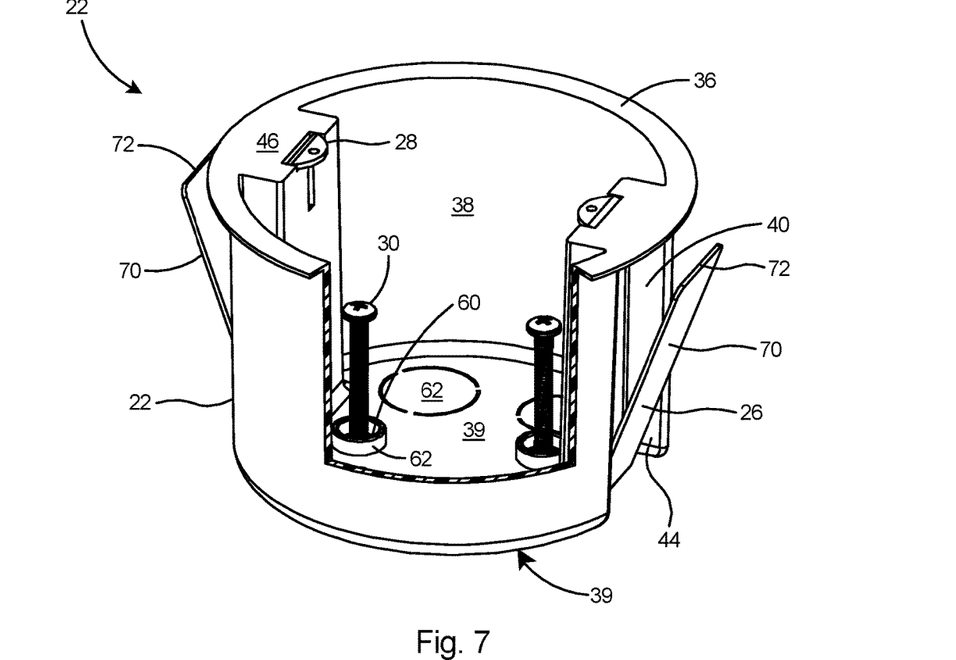
FIG. 7 is isometric view of the electrical box with a portion of the sidewall removed and with the cover brackets and countertop bracket assembled to the electrical box.

With reference to FIG. 7, the lower portion of the electrical box assembly includes the electrical box 22 with the cover brackets 28 secured to the channel covers 46 and the countertop bracket 26 assembled to the electrical box 22. Countertop bracket 26 is assembled to the electrical box 22 by mounting fasteners 30 extending through apertures 60 in bottom wall 39 of electrical box.

Figure 11:
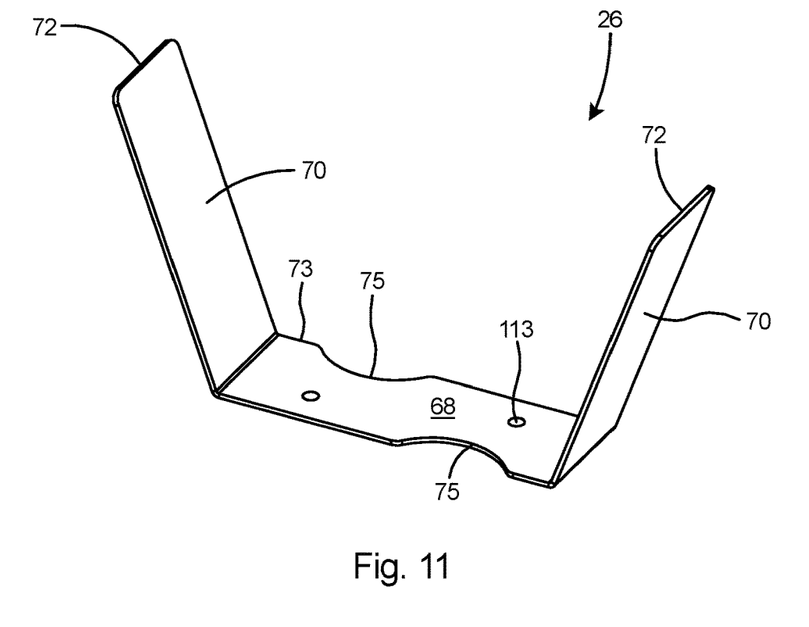
FIG. 11 is an isometric view of a countertop bracket that forms a portion of the electrical box assembly of FIG. 1.

Countertop bracket 26, as shown in FIG. 11, includes a base portion 68 and two outward extending arms 70 having ends 72. Base portion 68 includes two opposing sides 73 with arcuate cutouts 75 therein. As shown in FIG. 7, arms 70 of countertop bracket 26 are accommodated within the channels 40 of the electrical box by the channel sides 44. Countertop bracket 26 is preferably formed from metal sheet material, with the arms 70 flexible and resilient. Thus, if the lower portion of the electrical box assembly 20 is pressed into an appropriately sized hole (see FIG. 13) in a countertop, arms 70 of countertop bracket 26 will flex inward into channels 40 and then will snap outward after the ends 72 clear the surrounding periphery of the hole.

Figure 8:
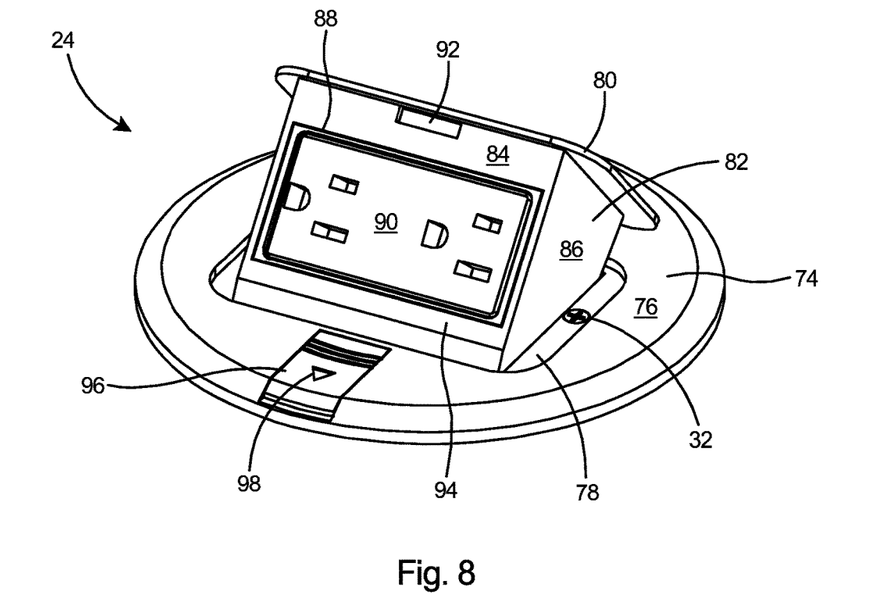
FIG. 8 is an isometric view of the cover with the cover in the open position.
Figure 9:
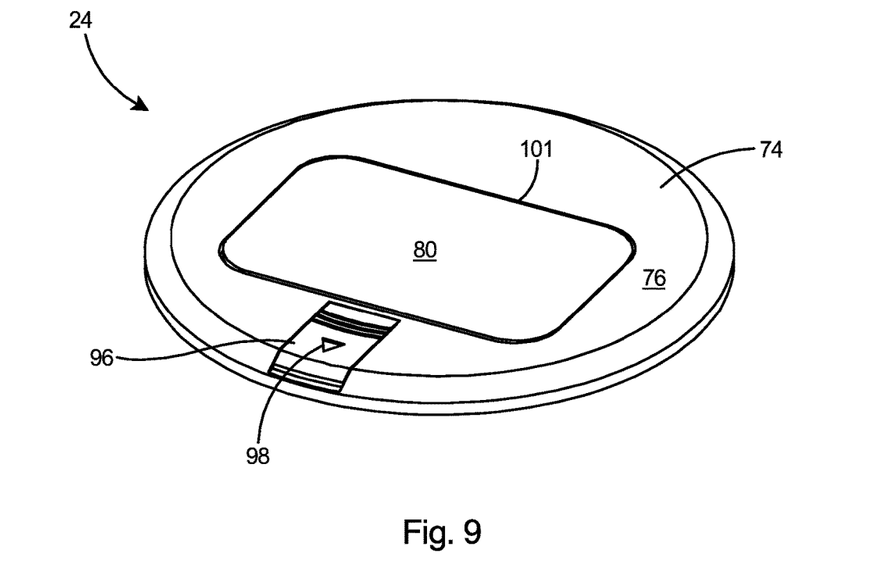
FIG. 9 is an isometric view of a cover with the cover in the closed position.

With reference to FIGS. 8 and 9, cover 24 includes a cover plate 74 with a top surface 76 and a recessed area 78 therein. Cover fasteners 32 hold the cover 24 secure to the electrical box (not shown). Cover 24 includes a lid 80 supported by a housing 82. The housing 82 includes a front wall 84, side walls 86, and a front opening 88 that may include an electrical component, such as a duplex receptacle 90 secured therein. The lid 80 overlaps the housing 82 and, when closed, fits within the recessed area 78 of the cover plate 74. A locking slot 92 is located on the front side 94 of the housing adjacent the lid 80 and a movable latch 96 is recessed into the cover plate 74. The lid 80 is preferably hinged on the back edge 101 and spring loaded on the underside of the housing 82. The movable latch 96 may be slid in the direction of arrow 98 to disengage latch 96 from locking slot 92 and thus spring lid 80 open to expose duplex receptacle 90 for insertion of electrical cords (not shown). After use, electrical cords are disconnected from the duplex receptacle and the lid is simply pushed closed, into the recessed area 78, while movable latch 96 is held forward and then released to engage latch 96 into locking slot 92 and thus lock lid 80 in the closed position as shown in FIG. 9. In the closed position, cover fasteners 32 (see FIG. 8) are obscured from view. Cover 24 is a trapdoor cover. The meaning of trapdoor cover as used herein is that the lid or door 80, when in the closed position, springs open to expose the duplex receptacle 90 when the latch 96 is activated.

Figure 10:
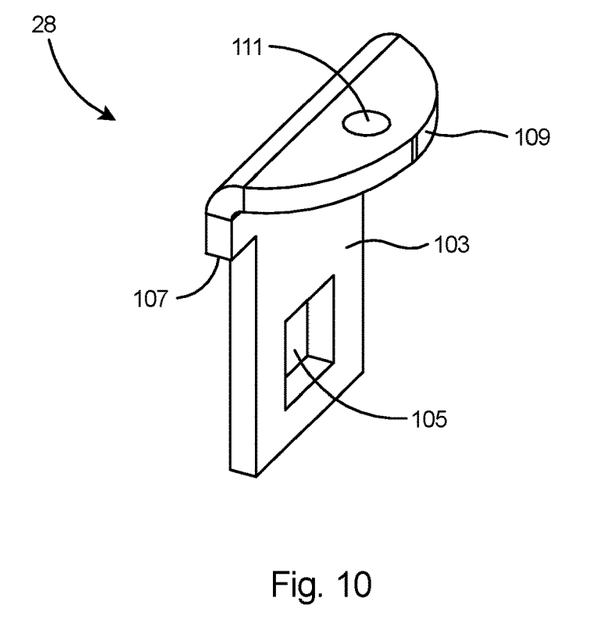
FIG. 10 is an isometric view of a cover bracket that forms a portion of the electrical box assembly of FIG. 1.
Figure 14:
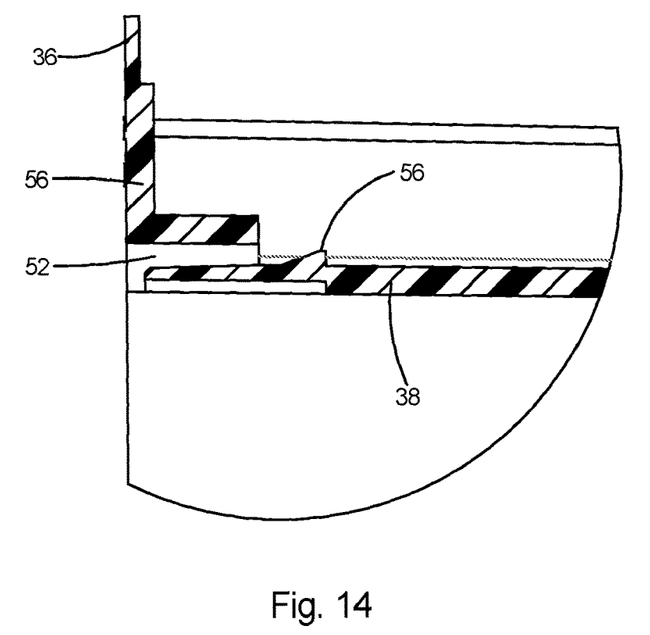
FIG. 14 is a detail view of a sidewall portion of the electrical box including the ramp.
Figure 15:
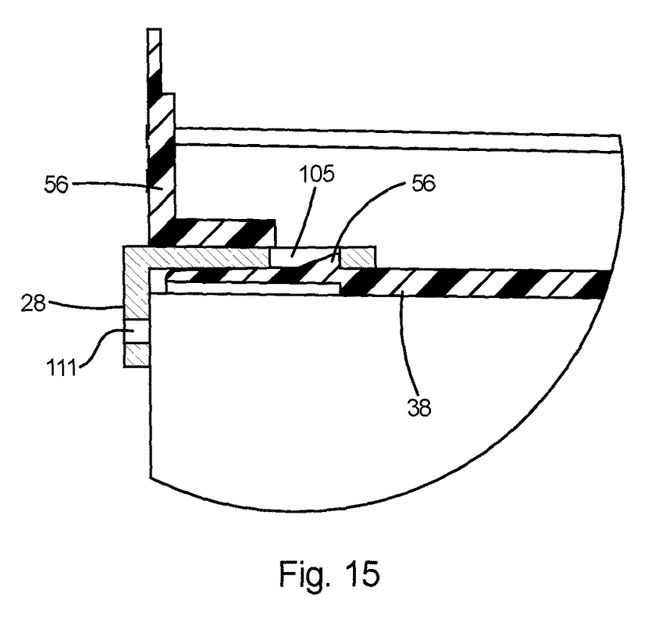
FIG. 15 is a detail view of a sidewall portion of the electrical box including the ramp and depicting the cover bracket secured to the electrical box by the ramp.

Referring to FIG. 10, a cover bracket 28 according to the invention includes a base 103 having an opening 105 therein, a shoulder 107, a tab 109 extending substantially perpendicular to the base, and an aperture 111 in the tab. As shown in FIG. 1, as cover brackets 28 are slid into slots 52 of electrical box 22, ramps 56 (see FIGS. 14 and 15) of electrical box snap through openings 105 of cover brackets, thereby securely locking the cover brackets 28 to the electrical box.

With reference to FIG. 11, the countertop bracket 26 includes the base portion 68 and two outward extending arms 70 with ends 72. Two apertures 113 are provided in the base portion 68 of the countertop bracket 26 to provide a means for engaging mounting fasteners 30 (see FIG. 1) for securing the electrical box 22 to the countertop bracket 26.

Referring to FIG. 13, the electrical box assembly 20 provides a means of installing a duplex receptacle or similar electrical component in a countertop. To install the electrical box assembly 20, power is first turned off at the main panel box. Before cutting a hole in the countertop, framing members and other possible obstructions are located. A circular hole is then cut in the countertop 220, typically with a hole-saw. Knockouts are removed from the electrical box 22 as necessary and wire is pulled into the box and secured to the box with a proper fitting. The countertop box is inserted into the cutout until the cover plate 74 is seated against the countertop, with the box desired orientation with respect to the backsplash 224. Both mounting fasteners 30 are simultaneously pushed toward the bottom of the countertop box until the countertop bracket 26 snaps beneath the countertop. The mounting fasteners 30 are then tightened, alternating between the two, until the electrical box 22 and countertop bracket 26 are secured properly to the underside of the countertop 220. The cover is then wired per all applicable National (NEC/CEC), state, and local codes. The cover is then placed into the countertop box and fastened with the cover fasteners 32.

Figure 12:
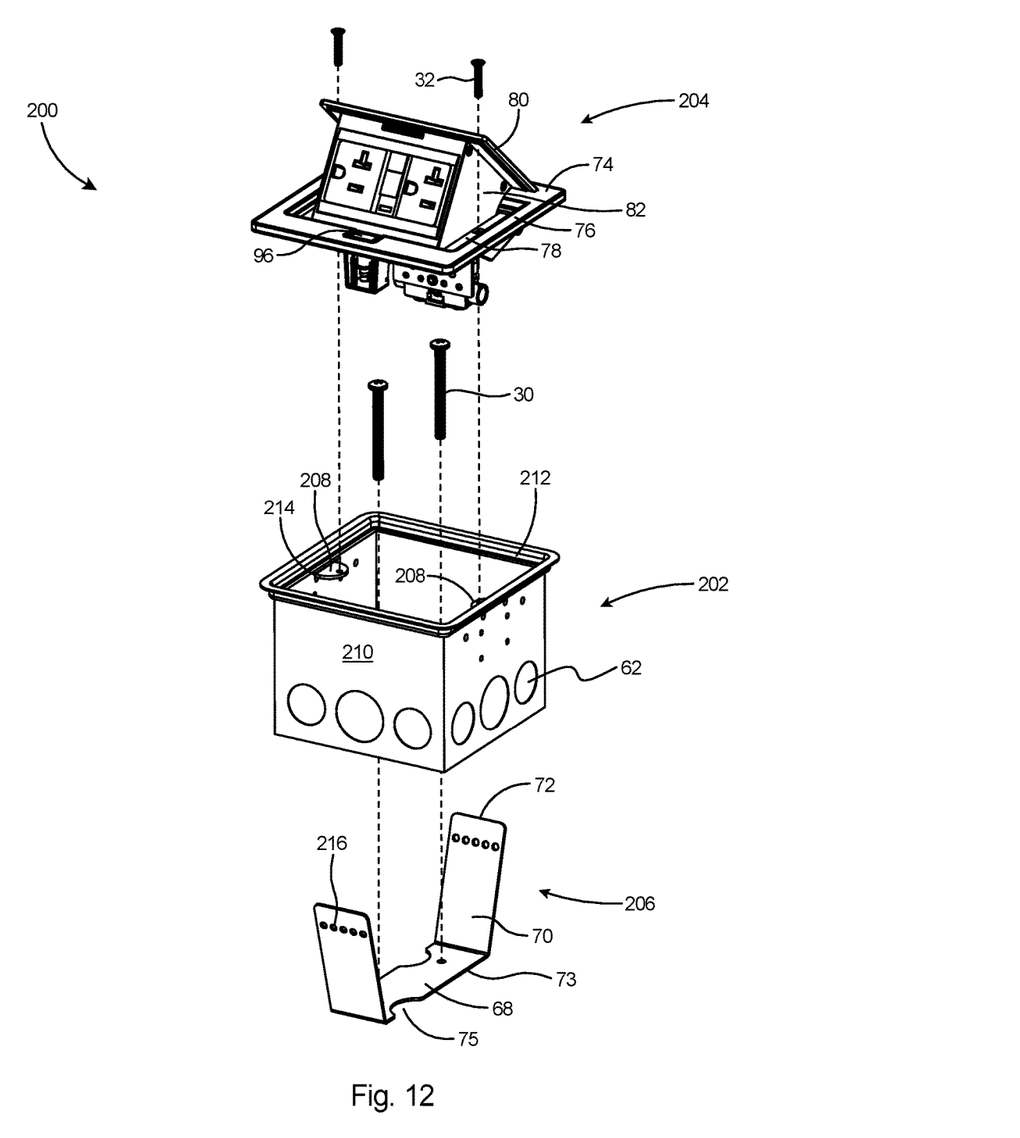
FIG. 12 is an exploded isometric view of a second embodiment of an electrical box assembly in accordance with embodiments of the invention.

With reference to FIG. 12, the second embodiment of the electrical box assembly 200 includes an electrical box 202, a cover 204, a countertop bracket 206, two cover brackets 208, mounting fasteners 30 for securing the electrical box 22 to the countertop bracket 206, and cover fasteners 32 for securing the cover 204 to the electrical box 202. The electrical box 202 includes four sidewalls 210, a rim 212, and slots 214 extending through the sidewalls substantially near the rim 212.

One or more knockouts 62 are provided in the sidewalls 210. Countertop bracket 206, similar to the first embodiment, includes a base portion 68 and two outward extending arms 70 having ends 72. Base portion 68 includes two opposing sides 73 with arcuate cutouts 75 therein. Additionally, countertop bracket 206 includes a parting line 216 on each arm 70. The parting line 216 provides a snap-off point for breaking a portion off of each arm, which would be broken off for installation of the electrical box assembly 200 in a countertop that is too deep for accommodating the entire length of the countertop bracket arms 70. For installation on a deep countertop, the installer would simply break the ends of the arms off at the parting line, thereby shortening the arms and enabling the box to fit a deeper countertop.

Similar to the first embodiment, cover 204 of electrical box assembly 200 includes a cover plate 74 with a top surface 76 and a recessed area 78 therein. Cover fasteners 32 hold the cover 204 secure to the electrical box 202. The cover 204 includes a lid 80 supported by a housing 82. The lid 80 overlaps the housing 82 and, when closed, fits within the recessed area 78 of the cover plate 74. A movable latch 96 is recessed into the cover plate 74 and enables the lid 80, housing 82, and the installed duplex receptacle 90 to pop out of the cover 204 or to be locked within the assembly as desired by the user.

With reference to FIG. 13, the electrical box assembly 20 provides a means of installing a duplex receptacle 90 to a countertop 220. To install the assembly, a hole 222 is cut in the countertop using a hole-saw (not shown). Initially, the electrical box 22 is loosely connected to the countertop bracket 26 by mounting fasteners 30 secured through threaded apertures 113 in base 68 of bracket and cover brackets 28 are engaged in the slots 52 of electrical box and held securely therein by ramps 56 (see FIGS. 14 and 15). The electrical box and bracket assembly are then pushed into the hole 222 until the ends 72 of arms 70 engage the underside of the countertop. Arms 70, which are flexible with respect to the base 68 of the bracket, flex inwardly as the bracket portion of the assembly is inserted through the hole 222. Cable (not shown) is pulled into the box and wiring terminations are completed to the duplex receptacle 90. The electrical box is aligned as desired, typically with the mounting brackets 28 parallel to the backsplash 224, after which the mounting fasteners 30 are tightened thereby securing the electrical box 22 to the countertop 220. If there is any misalignment, the mounting fasteners 30 can be loosened, the electrical box rotated to the proper alignment, and the mounting fasteners 30 retightened.

With the lid 80 in the open position, as shown in FIG. 13, the cover fasteners 32 are then tightened into the cover brackets 28, thereby securing the cover 24 to the electrical box 22. Should misalignment of the box or cover plate with respect to the desired alignment occur during installation, cover fasteners 32 may be loosened, the cover 24 removed, mounting fasteners 30 loosened and electrical box 22 rotated to the desired alignment, after which all mounting and cover fasteners may be secured to complete the installation. The lid 80 of the cover 24 may then be closed to obscure the cover fasteners as the lid will nest into the recessed area 78 (see FIG. 8) of the cover plate 74. The single-hole countertop preparation offers a significant advantage a conventional countertop box as realignment can be easily effected without requiring the re-drilling of holes around the periphery of the electrical box. The lid 80 and housing 82 are hinged to the cover plate 74 thereby enabling the lid and receptacle 90 to be sprung open or above the cover plate with simple manipulation of the latch 96.

The electrical box 22 may be constructed of plastic or metal, but is most preferably molded of plastic. The cover 24 may be constructed of plastic or metal, but is most preferably molded of metal. The countertop bracket 26 and cover brackets 28 are preferably constructed of metal.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical box assembly to mount an electrical component to a countertop having a top surface, a bottom surface, and a hole therein, comprising:

an electrical box including a bottom wall and a sidewall extending upward from an outer periphery said bottom wall to form an electrical enclosure;

a bracket assembly including a base having threaded apertures and a plurality of arms extending from said base, said arms to extend through the hole in the countertop;

threaded mounting fasteners extending through said bottom wall of said electrical box and into said threaded apertures in said base of said bracket assembly, said threaded mounting fasteners to secure said electrical box to said countertop;

a cover plate to attach to said electrical box and seat against the countertop;

a cover assembly including a lid attached to a housing assembly for mounting the electrical component, said lid including a back edge, said lid and said housing assembly rotatably connected to said cover plate at said back edge; and a latch on said cover plate and a slot on said housing in alignment with said latch, said latch to slide within the slot to lock said lid and housing assembly in a closed position on said cover plate.

2. The electrical box assembly of claim 1, further comprising a plurality of channels in said sidewall of said electrical box, each of said channels adapted to accommodate a corresponding one of said arms of said electrical box upon insertion of said electrical box through the countertop.

3. The electrical box assembly of claim 2, further comprising:

a channel cover on each of said channels of said electrical box; and a slot in each of said channel covers.

4. The electrical box assembly of claim 3, further comprising a ramp in each of said channels.

5. The electrical box assembly of claim 4, further comprising a cover bracket in each of said channels.

6. The electrical box assembly of claim 5, wherein said each of said cover brackets comprise:

a base; and an opening in said base of said cover brackets.

7. The electrical box assembly of claim 5, wherein each of said cover brackets comprise:
   a tab; and
   an aperture in said tab of said cover brackets.

* * * * *